United States Patent [19]

Bruemmer

[11] 4,284,651

[45] Aug. 18, 1981

[54] METHOD OF PREPARING CITRUS FRUIT SECTIONS WITH FRESH FRUIT FLAVOR AND APPEARANCE

[75] Inventor: Joseph H. Bruemmer, Tampa, Fla.

[73] Assignee: The United States of America as represented by the Secretary of Agriculture, Washington, D.C.

[21] Appl. No.: 171,627

[22] Filed: Jul. 23, 1980

Related U.S. Application Data

[63] Continuation-in-part of Ser. No. 50,895, Jun. 21, 1979, abandoned, which is a continuation-in-part of Ser. No. 944,679, Sep. 22, 1978, abandoned.

[51] Int. Cl.³ ............................................. A23L 1/212
[52] U.S. Cl. ..................................... 426/50; 426/287; 426/482; 426/616
[58] Field of Search ................. 426/50, 482, 287, 616

[56] References Cited

U.S. PATENT DOCUMENTS

| | | | |
|---|---|---|---|
| 1,601,027 | 9/1926 | Lefevre | 426/287 |
| 3,031,307 | 4/1962 | Blakemore | 426/50 |
| 3,347,678 | 10/1967 | Villadsen et al. | 426/50 |
| 3,607,316 | 9/1971 | Hume | 426/50 |

FOREIGN PATENT DOCUMENTS 51-110056  9/1976  Japan ......................................... 426/50

Primary Examiner—William F. Smith
Attorney, Agent, or Firm—M. Howard Silverstein; David G. McConnell; Raymond C. Von Bodungen

[57] ABSTRACT

A method of preparing citrus fruit sections with a fresh fruit flavor and appearance is disclosed. Thick albedo type grapefruit and oranges are cleaned and heated to a core temperature of about 20° to 40° C. They are subsequently scored to the juicy portion, vacuum infused with a commercial pectinase, incubated for critical time and temperature periods, and peeled. The resultant high quality fruit is stored in refrigeration.

3 Claims, No Drawings

METHOD OF PREPARING CITRUS FRUIT SECTIONS WITH FRESH FRUIT FLAVOR AND APPEARANCE

CROSS REFERENCE

This is a continuation-in-part of Ser. No. 50,895, filed June 21, 1979 abandoned, which is a continuation-in-part of Ser. No. 944,679, Filed Sept. 22, 1978, which is now abandoned.

BACKGROUND OF THE INVENTION

1. Field of the Invention:

This invention relates to a process of preparing thick albedo type citrus fruit sections by treating citrus fruit with enzymes to allow the removal of peel and separation of the sections from one another without the loss of juice or tissue.

2. Description of the Prior Art:

The conventional process of preparing sections for citrus fruit (Chemistry and Technology of Citrus, Citrus Products and By-Products, Agricultural Handbook #98, USDA, Washington, D.C., Sept. 1962) involves aging the fruit in bins for 4 to 6 days to loosen the peel and use of steam or steaming water to soften the peel for mechanical removal. Only the outer peel is removed by the steam treatment and the adhering albedo and membrane are "digested" by hot alkali. The alkali-treated fruit is then washed extensively with cold water to remove the alkali and lower the fruit temperature for sectionizing. After cooling, the fruit are positioned on a spindle for cutting blades to exercise the sections from the fruit. Only about 60% of the fruit section is recovered, the other 40% remains attached to the membrane and fruit core on the spindle or is lost as juice. The final product is packed in juice and syrup and heat pasteurized. This conventional process produces a product that does not contain the fresh flavor or texture of fresh fruit.

SUMMARY OF THE INVENTION

Thick albedo type citrus fruit in high quality appearance and flavor is processed into sections as follows: Grapefruit and oranges are detergent washed and rinsed for cleaning. The fruit is subsequently heated until the core temperature reaches about 20° to 40° C. The peel surface is scored to penetrate the albedo but not into the juicy portion of the sections, and the air bubbles of the albedo of the fruit is vacuum infused with an aqueous solution of pectinase at about 25 to 30 inches mercury, thus replacing the trapped gas bubbles in the albedo of the fruit with pectinase. After subsequently incubating for a period of about 10 to 60 minutes at about 30° to 60° C., the peel and outer membrane are removed and the juice sections are separated from the segment membranes.

Pectinase enzymes are used in processing citrus fruit for juice and purees. The enzymes disintegrate the fruit cells into fibers floating in the juice. It is well known that pectinases can be used to disintegrate citrus fruit to increase juice yield, and to disintegrate fruit adhering to citrus peel shells (U.S. Pat. No. 3,347,678 and 3,031,307). So it was a surprising and unexpected result of the instant invention to learn that the enzyme action could be used to loosen the peel and separate the juice sections intact one from another without destroying the juice cells.

It is the primary object of the invention to use enzymes to aid in the removal of peel and membranes from intact citrus fruit sections.

It is another object of the invention to infuse enzymes into the air bubbles of the albedo of citrus fruit to partially digest and peel and section membranes so that the fruit sections can be removed without loss of juice or tissue from the section.

It is another object of the invention to produce fruit chacterized by their firmness and wholeness and their fresh flavor.

DESCRIPTION OF THE PREFERRED EMBODIMENTS

In general, the overall process of the present invention may be described simply. The citrus fruit is subjected to the following operations. After washing with mild detergent and rinsing, the fruit is heated to a temperature that does not adversely affect the quality of the product but allows the enzymic softening process to proceed. Core temperatures should be kept in the range of 20° to 40° C. while the surface temperature could be between 40° and 60° C., but these temperatures are not exclusive and slightly lower and higher ranges are also operational. Next, the peel surface of the fruit is carefully scored with a knife so as to barely penetrate the albedo, or white layer, and not scratch the juice section. The warm fruit is then vacuum infused with an aqueous solution of a commercial pectinase. The fruit is submerged in a desired enzyme solution, placed under vacuum and the vacuum released. The enzyme solution penetrates the air bubbles of the thick albedo of the fruit and is retained in the fruit by the infusion process. The infused fruit is then incubated for a short time, 10 to 60 minutes at a temperature range of 30° to 60° C. After incubation, the fruit is removed from the oven and peeled and the juice sections removed intact from the walls and membranes. Fruit sections processed in this manner, retain the flavor, aroma, and texture of fresh fruit. The sections can be stored under refrigeration in various forms: dry, film coated in the liquid syrups and juice, to mention a few. The main advantages of the new process of making sections over the conventional method are increased yield and better quality. More importantly the new process eliminates polution problems of waste alkali disposal. Another advantage is water conservation. Water would not be required to wash the alkali from the fruit nor to cool the fruit before sectionizing.

The simplest practice of this invention follows in two examples:

EXAMPLE 1

A grapefruit, as characterized by its thick white albedo, is incubated in a water bath set at about 50° to 80° C. After about 10 to 60 minutes the rind reaches a temperature of about 40° to 60° C. and the core stays between about 20° and 40° C. The fruit is removed from the bath and the surface is scored in sextants, more or less, and deep enough to reach the albedo but not deep enough to rupture the juice segments. The fruit is then submerged in a beaker of pectinase solution at about 25° to 50° C. Commercial pectinases differ in their peeling activities. As little as 100 ppm of some products can be sufficient and as much as 10 times this concentration may be necessary for other products. Since these commercial pectinases differ, Table I is provided for determining the concentrations in ppm of pectinase of six different commercial products. Other pectinases will suffice, however, the six pectinases listed in Table I were tested in the instant invention. The beaker containing the fruit and pectinase solution is then placed in a container that can be evacuated. The air is removed by any evacuating means until a negative pressure of about 25 to 30 inches of mercury is attained. Bubbles of entrapped gases emerge from the albedo of the fruit during the evacuation process and are replaced by the enzyme solution when the vacuum is broken and atmospheric pressure is restored in this vacuum infiltration method. This procedure can be repeated with a slight increase in gas displacement, if necessary until all of the air bubbles in the albedo are saturated with the enzyme. The fruit is transferred to an incubator set at about 30° to 60° C. After 15 minutes to 2 hours of incubation at this temperature, the peel is easily mechanically removed. After mechanical removal of the peel, the juice segments are gently lifted from the core by hand, scoop, sectionizer, etc., and quickly chilled. These segments have the fresh fruit quality and represent 100% recovery of the juice sections.

EXAMPLE 2

A thick albedo type orange is incubated in a water bath set at about 50° to 80° C. After about 10 to 60 minutes the rind reaches a temperature of about 40° to 60° C. and the core stays between 20° and 40° C. The fruit is removed and the surface is scored in sextants, more of less, and deep enough to reach the albedo but not to rupture the juice segments. The fruit is then submerged in a beaker of pectinase solution at about 20° to 50° C. Since commercial pectinases differ in their peeling activities, Table II is provided to show the amounts of pectinase to be added depending on six commercial pectinase products tested. The beaker is then placed in a container that can be evacuated. Air is removed until pressure is reduced to about 25 to 30 inches of mercury, and then replaced. Bubbles of entrapped gases emerge from the thick albedo of the fruit and are replaced by the enzyme solution when the vacuum is broken and atmospheric pressure is restored in this vacuum infiltration method. The procedure can be repeated with a slight increase in gas displacement, if necessary until all the air bubbles in the albedo are saturated with the enzyme. The fruit is transferred to an incubator set at about 30° to 60° C. After 15 minutes to 2 hours at this temperature the peel is easily removed. Next, the juice segments are gently lifted from the core and quickly chilled. These segments have the fresh fruit quality and represent 100% recovery of the juice sections.

TABLE I

Minimum Concentration of Six Brands of Pectinases for Effective Peeling and Sectionizing of Grapefruit and/or Peeled Grapefruit and Peeled Oranges

| Pectinase - (Manufacturer) | conc. ppm. |
| --- | --- |
| Irgazyme - (Ciba Giegy) | 50–300 |
| Pectinex - (Novo Laboratories) | 50–300 |
| Klerzyme - (G. B. Fermentation Industries) | 250–1500 |
| Pektolafe - (Grindsted Products) | 500–3000 |
| Enzeco - (Enzyme Development Co.) | 500–3000 |
| Spark-L - (Miles Laboratories) | 1500–9000 |

TABLE II

Minimum Concentration of Six Brands of Pectinases for Effective Peeling and Sectionizing of Oranges.

| Pectinase - (Manufacturer) | conc. ppm. |
| --- | --- |
| Irgazyme - (Ciba Geigy) | 500–1500 |
| Pectinex - (Novo Laboratories) | 500–1500 |
| Klerzyme - (G. B. Fermentation Industries) | 2500–7500 |
| Pektolafe - (Grindsted Products) | 5000–15,000 |
| Enzeco - (Enzyme Development Co.) | 5000–15,000 |
| Spark-L - (Miles Laboratories) | 15,000–45,000 |

I claim:
1. A method for preparing thick albedo type citrus fruit sections with fresh fruit flavor and appearance comprising in combination the following steps:
    (a) washing the fruit with mild detergent and rinsing;
    (b) heating the citrus fruit to a surface temperature of about 40° to 60° C. and a core temperature of about 20° to 40° C.;
    (c) scoring the peel surface of the fruit so as to barely penetrate the albedo or white layer, but not to penetrate the juice sections;
    (d) vacuum infusing the air bubbles of the thick albedo of the fruit with an aqueous solution of pectinase at about 25 to 30 inches of mercury to replace the gas bubbles in the albedo of the fruit with pectinase solution;
    (e) incubating the fruit for a period of about 10 to 60 minutes at a temperature of about 30° to 60° C.;
    (f) removing the peel and other membrane of the fruit;
    (g) separating each juice section intact from the segment membranes;
    (h) storing the fruit under refrigeration.
2. The method of claim 1 wherein the citrus fruit is oranges.
3. The method of claim 1 wherein the citrus fruit is grapefruit.

* * * * *